(12) United States Patent
Ziskind et al.

(10) Patent No.: US 10,198,717 B2
(45) Date of Patent: *Feb. 5, 2019

(54) PARENTAL CONTROLS

(71) Applicant: BLAZER AND FLIP FLOPS, INC., San Diego, CA (US)

(72) Inventors: Benjamin Harry Ziskind, San Diego, CA (US); Joshua David Bass, Carlsbad, CA (US); Scott Sebastian Sahadi, Solana Beach, CA (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,620

(22) Filed: Aug. 22, 2017

(65) Prior Publication Data

US 2017/0372270 A1 Dec. 28, 2017

Related U.S. Application Data

(63) Continuation of application No. 14/633,019, filed on Feb. 26, 2015, now Pat. No. 9,741,022.

(Continued)

(51) Int. Cl.
*H04L 29/06* (2006.01)
*G06Q 10/10* (2012.01)
(Continued)

(52) U.S. Cl.
CPC ..... *G06Q 10/1095* (2013.01); *G06F 21/6218* (2013.01); *H04L 51/046* (2013.01); *H04L 63/101* (2013.01); *H04L 63/102* (2013.01); *H04W 4/021* (2013.01); *G06F 2221/2149* (2013.01); *H04L 63/18* (2013.01)

(58) Field of Classification Search
CPC ............ G06Q 10/1095; G06F 21/6218; G06F 2221/2149; H04L 51/046; H04L 63/101; H04L 63/102; H04L 63/18; H04W 4/021
See application file for complete search history.

(56) References Cited

U.S. PATENT DOCUMENTS

| 4,873,513 A | 10/1989 | Soults et al. |
| 5,978,744 A | 11/1999 | McBride |

(Continued)

FOREIGN PATENT DOCUMENTS

| EP | 1 288 627 | 3/2003 |
| EP | 2 650 692 | 10/2013 |

(Continued)

OTHER PUBLICATIONS

U.S. Appl. No. 14/632,884 Final Office Action dated Dec. 1, 2017.
(Continued)

*Primary Examiner* — Sarah Su
(74) *Attorney, Agent, or Firm* — Polsinelli LLP

(57) ABSTRACT

A web service platform to improve end-user engagement in a captive audience environment. Mobile and web-based clients allow application users to authorize and approve usage of entitlements of other users, including their children, based upon preconfigured rules and the proximity between the user requesting and the user approving authorization to use the entitlement.

23 Claims, 3 Drawing Sheets

Related U.S. Application Data

(60) Provisional application No. 61/945,053, filed on Feb. 26, 2014.

(51) Int. Cl.
  *G06F 21/62* (2013.01)
  *H04L 12/58* (2006.01)
  *H04W 4/021* (2018.01)

(56) References Cited

U.S. PATENT DOCUMENTS

| | | | |
|---|---|---|---|
| 6,142,368 | A | 11/2000 | Mullins et al. |
| 6,223,559 | B1 | 5/2001 | Coleman |
| 6,320,496 | B1 | 11/2001 | Sokoler et al. |
| 6,352,205 | B1 | 3/2002 | Mullins et al. |
| 6,369,840 | B1 | 4/2002 | Barnett et al. |
| 6,414,635 | B1 | 7/2002 | Stewart et al. |
| 6,474,557 | B2 | 11/2002 | Mullins et al. |
| 6,493,630 | B2 | 12/2002 | Ruiz et al. |
| 6,587,787 | B1 | 7/2003 | Yokota |
| 6,663,006 | B2 | 12/2003 | Mullins et al. |
| 6,687,608 | B2 | 2/2004 | Sugimoto et al. |
| 6,997,380 | B2 | 2/2006 | Safael et al. |
| 7,222,080 | B2 | 5/2007 | Hale et al. |
| 7,558,678 | B2 | 7/2009 | Jones |
| 7,802,724 | B1 | 9/2010 | Nohr |
| 7,992,773 | B1 | 8/2011 | Rothschild |
| 8,368,695 | B2 | 2/2013 | Howell et al. |
| 8,424,752 | B2 | 4/2013 | Rothschild |
| 8,427,510 | B1 | 4/2013 | Towfiq et al. |
| 8,433,342 | B1 | 4/2013 | Boyle et al. |
| 8,625,796 | B1 | 1/2014 | Ben Ayed |
| 8,651,369 | B2 | 2/2014 | Rothschild |
| 8,866,673 | B2 | 10/2014 | Mendelson |
| 8,936,190 | B2 | 1/2015 | Rothschild |
| 8,963,775 | B2 | 2/2015 | Faragher |
| 9,264,849 | B1 | 2/2016 | Kahn et al. |
| 9,448,085 | B2 | 9/2016 | Bass |
| 9,485,322 | B2 | 11/2016 | Krishnaswamy et al. |
| 9,491,584 | B1 | 11/2016 | Mendelson |
| 9,674,684 | B1 | 6/2017 | Mendelson |
| 9,741,022 | B2 | 8/2017 | Ziskind |
| 9,813,855 | B2 | 11/2017 | Sahadi |
| 9,813,862 | B2 | 11/2017 | Liu et al. |
| 9,829,339 | B2 | 11/2017 | Bass |
| 9,906,909 | B2 | 2/2018 | Sahadi |
| 9,909,896 | B2 | 3/2018 | Bass |
| 10,028,091 | B2 | 7/2018 | Sahadi |
| 10,129,728 | B2 | 11/2018 | Sahadi |
| 2002/0007292 | A1 | 1/2002 | Paxton et al. |
| 2002/0029226 | A1 | 3/2002 | Li et al. |
| 2002/0055863 | A1 | 5/2002 | Behaylo |
| 2002/0194246 | A1 | 12/2002 | Moskowitz et al. |
| 2003/0007464 | A1 | 1/2003 | Balani |
| 2004/0224703 | A1 | 11/2004 | Takaki et al. |
| 2005/0114014 | A1 | 5/2005 | Isaac |
| 2006/0074550 | A1 | 4/2006 | Freer et al. |
| 2006/0087474 | A1 | 4/2006 | Do et al. |
| 2006/0106850 | A1 | 5/2006 | Morgan et al. |
| 2007/0032269 | A1 | 2/2007 | Shostak |
| 2007/0118415 | A1 | 5/2007 | Chen et al. |
| 2007/0174115 | A1 | 7/2007 | Chieu et al. |
| 2007/0197247 | A1 | 8/2007 | Inselberg |
| 2007/0225904 | A1 | 9/2007 | Patanlone et al. |
| 2007/0239348 | A1 | 10/2007 | Cheung |
| 2007/0270166 | A1 | 11/2007 | Hampel et al. |
| 2008/0059889 | A1 | 3/2008 | Parker et al. |
| 2008/0067244 | A1 | 3/2008 | Marks |
| 2008/0183582 | A1 | 7/2008 | Major |
| 2008/0186164 | A1 | 8/2008 | Emigh et al. |
| 2008/0290182 | A1 | 11/2008 | Bell et al. |
| 2008/0306826 | A1 | 12/2008 | Kramer et al. |
| 2008/0312946 | A1 | 12/2008 | Valentine et al. |
| 2009/0017798 | A1 | 1/2009 | Pop |
| 2009/0027418 | A1 | 1/2009 | Maru et al. |
| 2009/0055208 | A1 | 2/2009 | Kaiser |
| 2009/0089131 | A1 | 4/2009 | Moukas et al. |
| 2009/0265428 | A1 | 10/2009 | Light et al. |
| 2009/0319306 | A1 | 12/2009 | Chanick |
| 2009/0319616 | A1 | 12/2009 | Lewis et al. |
| 2010/0037141 | A1 | 2/2010 | Carter et al. |
| 2010/0042320 | A1 | 2/2010 | Salmre et al. |
| 2010/0063854 | A1 | 3/2010 | Purvis et al. |
| 2010/0077036 | A1 | 3/2010 | DeLuca et al. |
| 2010/0161432 | A1 | 6/2010 | Kumanov et al. |
| 2010/0194784 | A1 | 8/2010 | Hoff et al. |
| 2011/0054976 | A1 | 3/2011 | Adler et al. |
| 2011/0078026 | A1 | 3/2011 | Durham |
| 2011/0090123 | A1 | 4/2011 | Sridhara et al. |
| 2011/0136507 | A1 | 6/2011 | Hauser et al. |
| 2011/0173545 | A1 | 7/2011 | Meola |
| 2011/0221745 | A1 | 9/2011 | Golman et al. |
| 2011/0231235 | A1 | 9/2011 | MacIlwaine et al. |
| 2011/0246148 | A1 | 10/2011 | Gupta et al. |
| 2011/0267369 | A1 | 11/2011 | Olsen et al. |
| 2012/0024947 | A1 | 2/2012 | Naelon |
| 2012/0069131 | A1 | 3/2012 | Abelow |
| 2012/0081250 | A1 | 4/2012 | Farrokhi et al. |
| 2012/0096490 | A1 | 4/2012 | Barnes |
| 2012/0166960 | A1 | 6/2012 | Salles |
| 2012/0172055 | A1 | 7/2012 | Edge |
| 2012/0179764 | A1 | 7/2012 | Erdal |
| 2012/0182933 | A1 | 7/2012 | Bandhakavi |
| 2012/0191497 | A1 | 7/2012 | Patterson |
| 2012/0197690 | A1 | 8/2012 | Agulnek |
| 2012/0197720 | A1 | 8/2012 | Bezancon et al. |
| 2012/0214515 | A1 | 8/2012 | Davis et al. |
| 2012/0239504 | A1 | 9/2012 | Curlander et al. |
| 2012/0270573 | A1 | 10/2012 | Marti et al. |
| 2012/0271691 | A1 | 10/2012 | Hammad et al. |
| 2012/0274642 | A1 | 11/2012 | Ofek et al. |
| 2012/0284117 | A1 | 11/2012 | Karandikar |
| 2013/0012235 | A1 | 1/2013 | Burdo et al. |
| 2013/0024203 | A1 | 1/2013 | Flores et al. |
| 2013/0024265 | A1 | 1/2013 | Lotzof |
| 2013/0030875 | A1 | 1/2013 | Lee et al. |
| 2013/0036455 | A1 | 2/2013 | Bodi et al. |
| 2013/0052990 | A1 | 2/2013 | Zhang |
| 2013/0059603 | A1 | 3/2013 | Guenec et al. |
| 2013/0073381 | A1 | 3/2013 | Binkley |
| 2013/0085834 | A1 | 4/2013 | Witherspoon et al. |
| 2013/0091452 | A1* | 4/2013 | Sorden ............... G06F 3/048 715/771 |
| 2013/0124234 | A1 | 5/2013 | Nilsson et al. |
| 2013/0132230 | A1 | 5/2013 | Gibson et al. |
| 2013/0137464 | A1 | 5/2013 | Kramer et al. |
| 2013/0157655 | A1 | 6/2013 | Smith et al. |
| 2013/0158867 | A1 | 6/2013 | Sidhu et al. |
| 2013/0173377 | A1 | 7/2013 | Keller et al. |
| 2013/0173393 | A1 | 7/2013 | Calman et al. |
| 2013/0191213 | A1 | 7/2013 | Beck et al. |
| 2013/0225282 | A1 | 8/2013 | Williams et al. |
| 2013/0231135 | A1 | 9/2013 | Garskof |
| 2013/0267260 | A1 | 10/2013 | Chao et al. |
| 2013/0279543 | A1 | 10/2013 | Torimoto et al. |
| 2013/0281084 | A1 | 10/2013 | Batada et al. |
| 2013/0317944 | A1 | 11/2013 | Huang et al. |
| 2013/0339073 | A1 | 12/2013 | Dabbiere |
| 2014/0025466 | A1 | 1/2014 | Borton et al. |
| 2014/0058766 | A1 | 2/2014 | Yu et al. |
| 2014/0067544 | A1 | 3/2014 | Klish et al. |
| 2014/0073363 | A1 | 3/2014 | Tidd et al. |
| 2014/0074593 | A1 | 3/2014 | Chomsky et al. |
| 2014/0082509 | A1 | 3/2014 | Roumeliotis et al. |
| 2014/0118113 | A1 | 5/2014 | Kaushik et al. |
| 2014/0122040 | A1 | 5/2014 | Marti |
| 2014/0128103 | A1 | 5/2014 | Joao et al. |
| 2014/0129266 | A1 | 5/2014 | Perl et al. |
| 2014/0132772 | A1* | 5/2014 | Billau ............ G08B 13/19682 348/159 |
| 2014/0162693 | A1 | 6/2014 | Wachter et al. |
| 2014/0164761 | A1 | 6/2014 | Kufluk et al. |
| 2014/0188614 | A1 | 7/2014 | Badenhop |

(56) References Cited

U.S. PATENT DOCUMENTS

| | | | |
|---|---|---|---|
| 2014/0189802 A1* | 7/2014 | Montgomery | H04L 63/08 726/4 |
| 2014/0207509 A1 | 7/2014 | Yu et al. | |
| 2014/0228060 A1 | 8/2014 | Abhyanker | |
| 2014/0237076 A1 | 8/2014 | Goldman et al. | |
| 2014/0244332 A1 | 8/2014 | Mermelstein | |
| 2014/0253383 A1 | 9/2014 | Rowitch | |
| 2014/0256357 A1 | 9/2014 | Wang et al. | |
| 2014/0257991 A1 | 9/2014 | Christensen et al. | |
| 2014/0278054 A1 | 9/2014 | Tidd et al. | |
| 2014/0292481 A1 | 10/2014 | Dumas et al. | |
| 2014/0342760 A1 | 11/2014 | Moldaysky et al. | |
| 2015/0028996 A1 | 1/2015 | Agrafioti et al. | |
| 2015/0035644 A1 | 2/2015 | June et al. | |
| 2015/0038171 A1 | 2/2015 | Uilecan et al. | |
| 2015/0052460 A1 | 2/2015 | Mohammad Mirzaei et al. | |
| 2015/0058133 A1 | 2/2015 | Roth et al. | |
| 2015/0074558 A1 | 3/2015 | Haskins et al. | |
| 2015/0080014 A1 | 3/2015 | Ben-Yosef et al. | |
| 2015/0081348 A1 | 3/2015 | Avera et al. | |
| 2015/0100398 A1 | 4/2015 | Narayanaswami et al. | |
| 2015/0112841 A1 | 4/2015 | Ivanovic et al. | |
| 2015/0127445 A1 | 5/2015 | Jaffee | |
| 2015/0154674 A1 | 6/2015 | Todasco | |
| 2015/0176997 A1 | 6/2015 | Pursche et al. | |
| 2015/0181384 A1 | 6/2015 | Mayor et al. | |
| 2015/0222935 A1 | 8/2015 | King et al. | |
| 2015/0229626 A1* | 8/2015 | Hauhn | G07C 9/00 726/4 |
| 2015/0233715 A1 | 8/2015 | Xu et al. | |
| 2015/0237473 A1 | 8/2015 | Koepke | |
| 2015/0241238 A1 | 8/2015 | Bass | |
| 2015/0242890 A1 | 8/2015 | Bass | |
| 2015/0244725 A1 | 8/2015 | Ziskind | |
| 2015/0262086 A1 | 9/2015 | Mader et al. | |
| 2015/0262216 A1 | 9/2015 | Aziz et al. | |
| 2015/0294303 A1 | 10/2015 | Hanson et al. | |
| 2015/0296347 A1 | 10/2015 | Roth | |
| 2015/0334569 A1 | 11/2015 | Rangarajan et al. | |
| 2015/0334676 A1 | 11/2015 | Hart et al. | |
| 2016/0005003 A1 | 1/2016 | Norris et al. | |
| 2016/0050526 A1 | 2/2016 | Liu et al. | |
| 2016/0063537 A1 | 3/2016 | Kumar | |
| 2016/0078370 A1* | 3/2016 | McEwen | G06Q 10/02 705/5 |
| 2016/0105644 A1 | 4/2016 | Smith et al. | |
| 2016/0127351 A1 | 5/2016 | Smith et al. | |
| 2016/0150370 A1 | 5/2016 | Gillespie et al. | |
| 2016/0242010 A1 | 8/2016 | Parulski et al. | |
| 2016/0286361 A1 | 9/2016 | Ciecko | |
| 2016/0300192 A1 | 10/2016 | Zamer | |
| 2016/0316324 A1 | 10/2016 | Sahadi | |
| 2016/0321548 A1 | 11/2016 | Ziskind | |
| 2016/0323708 A1 | 11/2016 | Sahadi | |
| 2017/0010119 A1 | 1/2017 | Bass | |
| 2017/0011348 A1 | 1/2017 | Ziskind | |
| 2017/0161720 A1 | 6/2017 | Xing et al. | |
| 2017/0162006 A1 | 6/2017 | Sahadi | |
| 2017/0169449 A1 | 6/2017 | Heaven et al. | |
| 2017/0237820 A1* | 8/2017 | Scarborough | G06Q 20/3224 709/226 |
| 2017/0248438 A1 | 8/2017 | Bass | |
| 2018/0005194 A1 | 1/2018 | Dotan-Cohen et al. | |
| 2018/0012195 A1 | 1/2018 | Nagaraj | |
| 2018/0124559 A1 | 5/2018 | Sahadi | |
| 2018/0192248 A1 | 7/2018 | Sahadi | |

FOREIGN PATENT DOCUMENTS

| | | |
|---|---|---|
| WO | WO 2011/115855 | 9/2011 |
| WO | WO 2011/159811 | 12/2011 |
| WO | WO 2013/163444 | 10/2013 |
| WO | WO 2015/017442 | 2/2015 |
| WO | WO 2015/130969 | 9/2015 |
| WO | WO 2015/130971 | 9/2015 |
| WO | WO 2016/172731 | 10/2016 |
| WO | WO 2016/176506 | 11/2016 |
| WO | WO 2016/179098 | 11/2016 |
| WO | WO 2017/100801 | 6/2017 |

OTHER PUBLICATIONS

Feng et al., Yue ; "Effective venue image retrieval using robust feature extraction and model constrained matching for mobile robot localization", Machine Vision and Applications, DOI 10.1007/s00138-011-0350-z, Oct. 28, 2010.

Krueger, Robert; Thom, Dennis; Ertl, Thomas; "Visual Analysis of Movement Behavior using Web Data for Context Enrichment" Institute for Visualization and Interactive Systems (VIS), Published in *Pacific Visualization Symposium (Pacific Vis), 2014 IEEE*, pp. 193-200.IEEE, 2014.

Sim, Robert; Dudek, Gregory; "Effective Exploration Strategies for the Construction of Visual Maps", Centre for Intelligent Machines, Published in: Intelligent Robots and Systems, 2003. (IROS 2003). Proceedings. 2003 IEEE/RSJ International Conference on (vol. 4) Date of Conference: Oct. 27-31, 2003.

PCT Application No. PCT/US2004/12667, International Search Report dated Oct. 29, 2004.

PCT Application No. PCT/US2015/017827, International Search Report and Written Opinion dated Jun. 11, 2015.

PCT Application No. PCT/US2015/017829, International Search Report and Written Opinion dated Jun. 8, 2015.

PCT Application No. PCT/US2016/029260, International Search Report and Written Opinion dated Jul. 27, 2016.

PCT Application No. PCT/US2016/029880, International Search Report and Written Opinion dated Jul. 27, 2016.

PCT Application No. PCT/US2016/030424, International Search Report and Written Opinion dated Jul. 29, 2016.

PCT Application No. PCT/US2016/067582, International Search Report and Written Opinion dated Mar. 17, 2017.

U.S. Appl. No. 14/632,872 Office Action dated Mar. 7, 2016.
U.S. Appl. No. 15/271,087 Office Action dated Jun. 7, 2017.
U.S. Appl. No. 15/597,609 Office Action dated Jul. 10, 2017.
U.S. Appl. No. 14/632,884 Office Action dated May 19, 2017.
U.S. Appl. No. 14/633,015 Office Action dated Apr. 13, 2017.
U.S. Appl. No. 14/633,019 Final Office Action dated Nov. 10, 2016.
U.S. Appl. No. 14/633,019 Office Action dated May 6, 2016.
U.S. Appl. No. 15/138,157 Office Action dated Mar. 9, 2017.
U.S. Appl. No. 15/144,359 Office Action dated Apr. 5, 2017.
U.S. Appl. No. 15/383,710 Office Action dated Aug. 16, 2017.
U.S. Appl. No. 14/632,884 Office Action dated Apr. 2, 2018.
U.S. Appl. No. 15/805,014 Office Action dated Apr. 5, 2018.
U.S. Appl. No. 14/633,015 Final Office Action dated Dec. 28, 2017.
U.S. Appl. No. 15/383,710 Final Office Action dated Jan. 30, 2018.
U.S. Appl. No. 15/906,285 Office Action dated May 9, 2018.
U.S. Appl. No. 15/906,285, Scott S. Sahadi, Map Based Beacon Management.

European Patent Application 15754659.9 Extended European Search Report dated Sep. 29, 2017.

U.S. Appl. No. 14/633,015 Office Action dated Jun. 25, 2018.

Testa et al., Leonard; "Evolving Efficient Theme Parks Tours", Journal of Computing and Info Tech-CIT 7, 1999, 1, 77-92.

U.S. Appl. No. 15/141,780 Office Action dated Oct. 1, 2018.

European Patent Application 16789894.9 Extended European Search Report dated Oct. 17, 2018.

\* cited by examiner

PARENTAL CONTROLS

CROSS-REFERENCE TO RELATED APPLICATIONS

The present application is a continuation and claims the priority benefit of U.S. patent application Ser. No. 14/633,019 filed Feb. 26, 2015, issuing as U.S. Pat. No. 9,741,022, which claims the priority benefit of U.S. provisional application 61/945,053 filed Feb. 26, 2014, the disclosures of which are incorporated herein by reference.

BACKGROUND

Field of the Invention

The present invention generally relates to web services. More specifically, the present invention concerns parental controls.

Description of the Related Art

Families often separate to enjoy different activities while attending popular attractions such as theme parks, cruise ships, stadiums, sporting venues, and resorts. Parents understandably want to monitor, restrict, or grant permission to their children when they want to view or participate in age or content restricted activities such as watching shows, riding rides, or watching digital content when they are not physically present with their children. Absent being physically present or having some other chaperone, there is no way to ensure proper supervision and restrictions while granting children reasonable freedom and separation.

There is a need in the art for an improved methodology for parents to monitor and grant or deny permission to their children when they want to access content or activities while physically separated from their parents.

SUMMARY OF THE PRESENTLY CLAIMED INVENTION

In a first claimed embodiment of the present invention, a method for controlling access to entitlements is disclosed. An entitlement for a first user is detected. An authorization message is then sent to a second user having control of entitlement access for the first user. Authorization for the first user to enjoy the entitlement is then received from the second user.

DETAILED DESCRIPTION

The present invention includes a web service platform to enable the user to remotely authorize a different person's access to content or services when not in the presence of the person requesting access. Mobile and web-based clients enable application users to automatically request authorization, grant or deny access.

Figure 1:
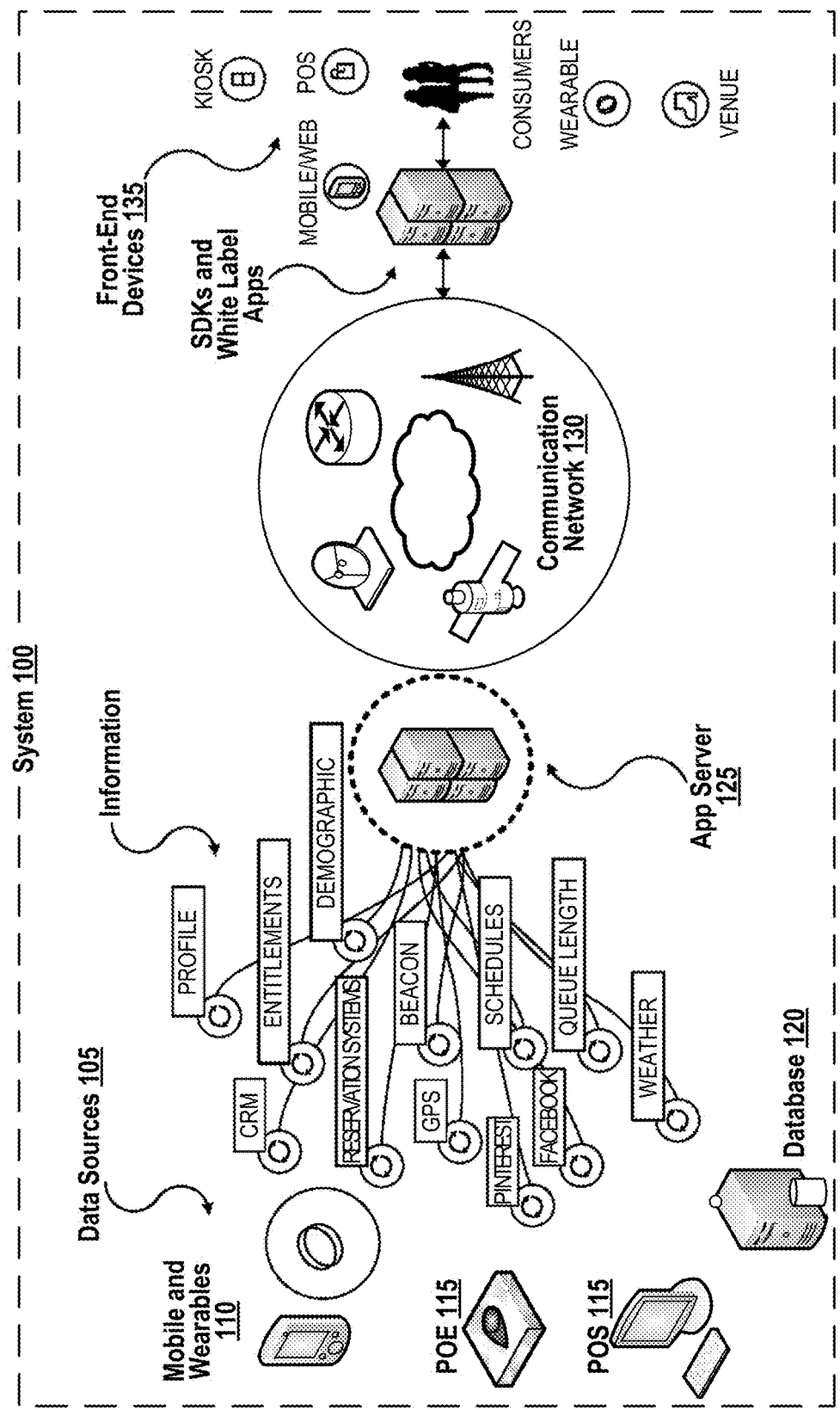
FIG. 1 illustrates a system for increasing customer engagement, including redeeming user entitlements.

FIG. 1 illustrates a system 100 for increasing customer engagement, including redeeming user entitlements. The system 100 of FIG. 1 includes an ecosystem of data sources 105 such as mobile devices 110, point-of-sale (POS) or point-of-entry/-exit (POE) terminals 115, and databases 120. Communicatively coupled to data sources 105 are back-end application servers 125. In system 100, application servers 125 can ingest, normalize and process data collected from mobile devices 110 and various POS or POE terminals 115. Types of information gathered from data sources 105 and processed by back-end application servers 125 are generally inclusive of identity (e.g., user profiles, CRM data, entitlements, demographics, reservation systems and social media sources like Pintrest and Facebook), proximity (e.g., GPS and beacons), and time (e.g., schedules, weather, and queue length).

Mobile devices 110 can execute an application on a user mobile device that shares customer engagement data such as current and prior physical locale within a venue as well as wait times and travel times (e.g., how long was a customer at a particular point in a venue and how long did it take the customer to travel to a further point in a venue). Mobile devices 110 are inclusive of wearable devices. Wearable devices (or 'wearables') are any type of mobile electronic device that can be worn on the body or attached to or embedded in clothes and accessories of an individual. Processors and sensors associated with a wearable can gather, process, display, and transmit and receive information.

POS data may be gathered at a sales terminal 115 that may interact with a mobile or wearable device 110 to track customer purchase history at a venue or preference for engagement at a particular locale within the venue. POE terminals 115 may provide data related to venue traffic flow, including entry and exit data that can be inclusive of time and volume. POE terminals 115 may likewise interact with mobile and wearable devices 110.

Historical data may also be accessed at databases 120 as a part of the application server 125 processing operation. The results of a processing or normalization operation may likewise be stored for later access and use. Processing and normalization results may also be delivered to front-end applications (and corresponding application servers) that allow for the deployment of contextual experiences and provide a network of services to remote devices as is further described herein.

The present system 100 may be used with and communicate with any number of external front-end devices 135 by way of communications network 130. Communication network 130 may be a local, proprietary network (e.g., an intranet) and/or may be a part of a larger wide-area network. Communication network 130 may include a variety of connected computing device that provide one or more elements of a network-based service. The communications network 130 may include actual server hardware or virtual hardware simulated by software running on one or more actual machines thereby allowing for software controlled scaling in a cloud environment.

Communication network 130 allows for communication between data sources 105 and front-end devices 135 via any number of various communication paths or channels that collectively make up network 130. Such paths and channels may operate utilizing any number of standards or protocols including TCP/IP, 802.11, Bluetooth, GSM, GPRS, 4G, and LTE. Communications network 130 may be a local area network (LAN) that can be communicatively coupled to a wide area network (WAN) such as the Internet operating through one or more network service provider.

Information received and provided over communications network 130 may come from other information systems such as the global positioning system (GPS), cellular service providers, or third-party service providers such as social networks. The system 100 can measure location and proximity using hardware on a user device (e.g., GPS) or collect the data from fixed hardware and infrastructure such as Wi-Fi positioning systems and Radio Frequency ID (RFID) readers. An exemplary location and proximity implementation may include a Bluetooth low-energy beacon with real time proximity detection that can be correlated to latitude/longitude measurements for fixed beacon locations.

Additional use cases may include phone-based, GPS, real-time location (latitude/longitude) measurements, phone geo-fence-real time notifications when a device is moving into or out of location regions, Wi-Fi positioning involving user location detection based on Wi-Fi signal strength (both active or passive), RFID/Near Field Communication (NFC), and cellular tower positioning involving wide range detection of user device location, which may occur at the metro-level.

Front-end devices 135 are inclusive of kiosks, mobile devices, wearable devices, venue devices, captive portals, digital signs, and POS and POE devices. It should be noted that each of these external devices may be used to gather information about one or more consumers at a particular location during a particular time. Thus, a device that is providing information to a customer on the front-end (i.e., a front-end device 135) such as a mobile device executing an application or a specially designed wearable can also function as a data source 105 as described above.

The system 100 of FIG. 1 provides services to connect venue management with visitors and entertainment consumers while simultaneously providing a messaging platform for consumers. For example, the social network of a consumer may be extended into a map and the physical world associated with the map. Services to extend the social network of a user include finding friends and family and management of proximity based parental controls.

Figure 2:
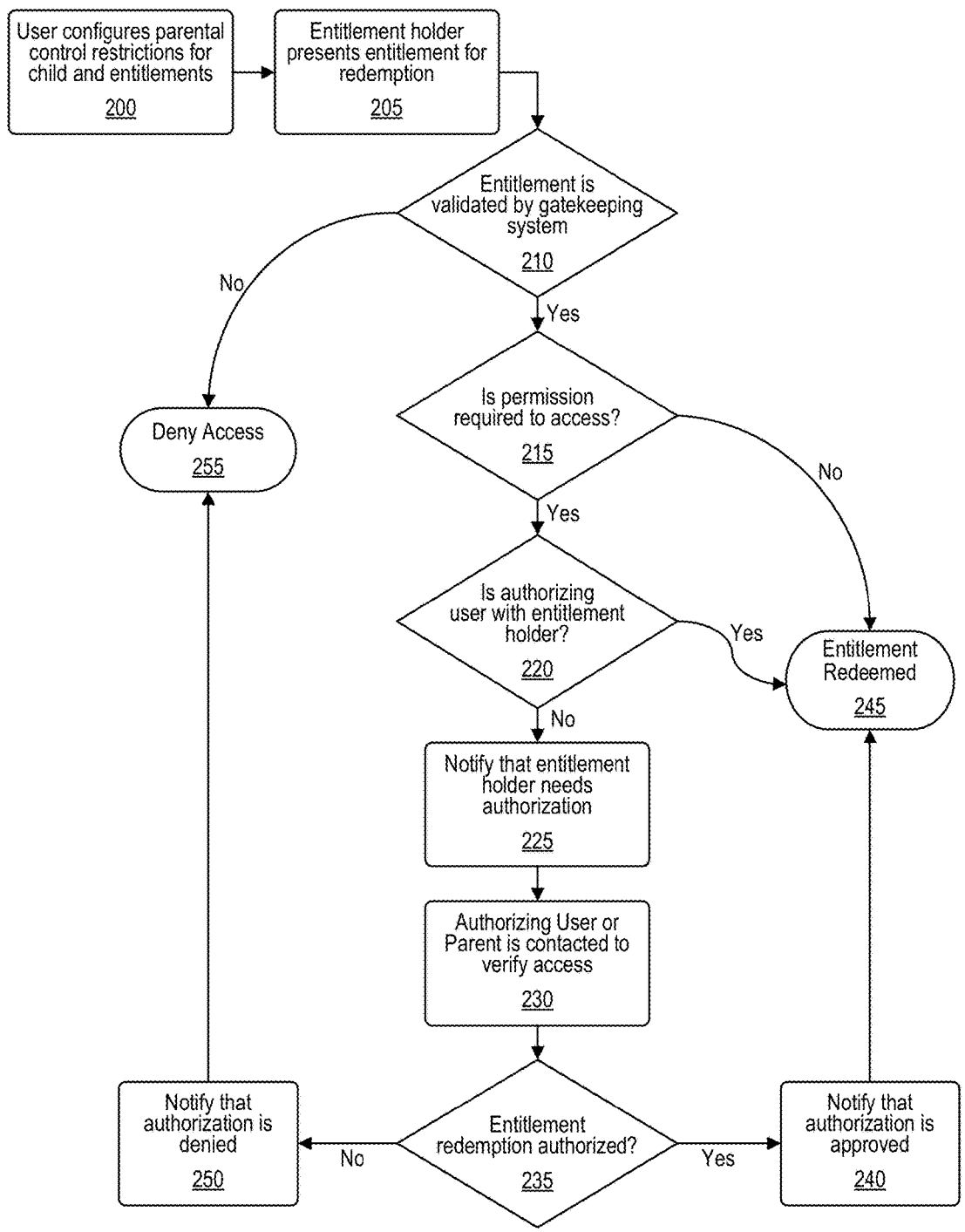
FIG. 2 is a method for redeeming entitlement rights.

FIG. 2 is a method for redeeming entitlement rights. The method of FIG. 2 may be performed by an end user with a mobile device 110 in a system 100 like that of FIG. 1. A web services platform may operate at application server 125 of FIG. 1 either alone or in conjunction with a mobile application or web application executing on mobile device 110.

The method of FIG. 2 allows an authorizing user to not be physically present when the entitlements are redeemed while still providing the opportunity for the authorizing user to make a decision whether to grant access. Further, the authorizing user is only contacted to provide access in the event they are not physically present at the location where the entitlements are being redeemed. The method of FIG. 2 may utilize one or more location based services in the context of system 100.

Through the method of FIG. 2, an end user configures parental controls for a child or other minor at step 200. Configuration includes, but is not limited to, specifying which entitlements will automatically be authorized or rejected, the distance end user must be from their child or minor before they will be notified to grant access, and whether the end user only wants to be notified of entitlement redemptions or wants to grant permission before the entitlement can be redeemed.

Entitlements can have many manifestations. For example, an entitlement may include a ticket to access a physical location such as an amusement park, show, movie, or sporting event. Entitlements might likewise include rights to use a transportation service or for digital goods including rights to purchase, play, use, watch, or listen to content. Use of content may be on a set-top box, mobile device, kiosk, or other form of entertainment system, including tablet devices.

The entitlement holder (such as a younger child) may attempt to redeem an entitlement by presenting a physical ticket or displaying a ticket on a mobile device 110 at step 205. When the entitlement holder presents their entitlement for redemption, an automated ticket reader (e.g., QR Code, RFID reader, Bluetooth beacon) or ticket processing kiosk will at step 210 scan and verify the authenticity of the entitlement. If the entitlement is invalid because it has already been redeemed or for some other reason, access is denied (255).

If the entitlement is valid and no parental control restrictions have been assigned to the entitlement or the individual holding the entitlement as determined at step 215, the user redeeming the entitlement is authorized at step 245 and may proceed to enter the gate or other ticketed area. In the case of content delivery, the user may then begin downloading, playing, watching, or listening to the same.

If the parental control settings defined in step 200 have assigned restrictions to the entitlement or the entitlement holder (or both), then further authorization is required at step 215 before the entitlement holder is authorized to access the content or proceed into the otherwise ticketed or prohibited area. In the event that permissions are required, the web service will determine whether parent end-user, is currently in the physical presence of the user redeeming the entitlement at step 220. The location of parental end user may be determined based on location based technology in a mobile device 110 or wearable reporting its location to web services platform executing at application server 135 or through monitoring of the location of end user with proximity technology such as Wi-Fi MAC address harvesting, which would also be reported to web services platform. For entitlements that grant access to a physical location, the location of the entitlement holder may be determined based on the location of the point of sale or gate control system. The entitlement holder's location may also be determined based on mobile technologies like those discussed above.

At step 220, if the authorizing end user is in proximity of the user redeeming the entitlement and the preferences defined at step 300 are configured to allow access based on proximity of end user 48 and the entitlement holder, the web service platform will authorize access in step 245. Indication of authorization may be transmitted to a mobile device, wearable, or other device such as a kiosk or ticket scanning device.

If the end user is not in the same location as the entitlement holder, the web service platform will require additional permission from the end user before authorizing the entitlement holder to proceed in step 220. If the entitlement holder is redeeming the entitlement on a mobile device 110 or wearable, the device may display a message or indicator light at step 225 indicating that authorization is required before they can proceed. If the entitlement is being redeemed at a gate using the likes of a point of sale system or kiosk, a message or indicator light may be displayed to the operator that authorization is required before the entitlement holder can proceed.

In such an event, end user will be contacted at step 230 to grant the entitlement holder access. Contact may take the form of a message sent to a mobile device or wearable. In some embodiments, a phone call may be initiated be a real-person or an automated system. The method of contact can be determined based on the user preferences defined in step 200.

If the entitlement redemption is authorized in step 235, notification may be displayed in the point of sale, gate control system, or kiosk at step 240. The entitlement is then redeemed at step 245. If the entitlement redemption is authorized in step 235, notification of authorization being granted by end user may be displayed to the mobile device of the entitlement holder at step 240 and the entitlement is redeemed at step 245.

If the entitlement redemption is denied in step 235, notification may be displayed in the point of sale, gate control system, or kiosk at step 250; access would formally be denied in step 255. If the entitlement redemption is denied in step 235, notification of the authorization being denied by end user may be displayed to the entitlement holder by way of their mobile device or wearable at step 250.

Figure 3:
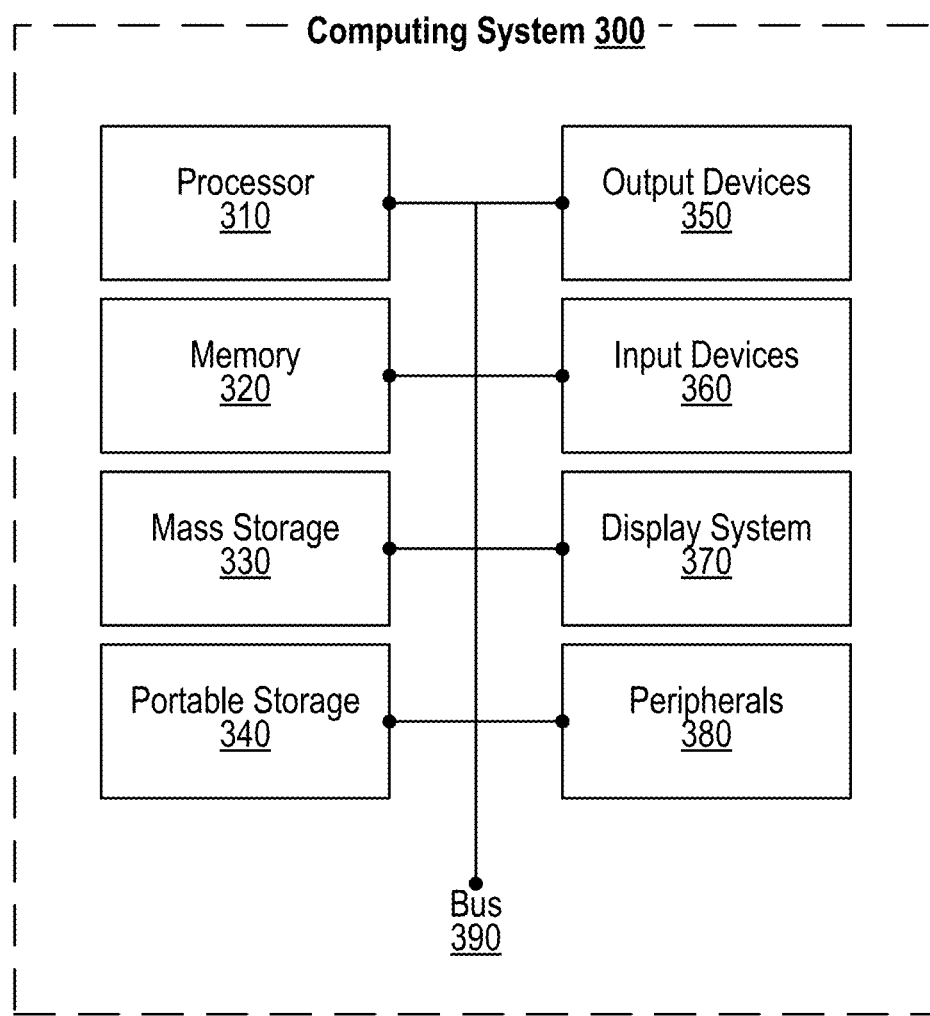
FIG. 3 illustrates an exemplary computing system that may be utilized to implement one or more embodiments of the present invention.

FIG. 3 illustrates an exemplary computing system that may be utilized to implement one or more embodiments of the present invention. System 300 of FIG. 3, or portions thereof, may be implemented in the likes of client computers, application servers, web servers, mobile devices, wearable devices, and other computing devices. The computing system 300 of FIG. 3 includes one or more processors 310 and main memory 320. Main memory 320 stores, in part, instructions and data for execution by processor 310. Main memory 320 can store the executable code when in operation. The system 300 of FIG. 3 further includes a mass storage device 330, portable storage medium drive(s) 340, output devices 350, user input devices 360, a graphics display 370, and peripheral device ports 380.

While the components shown in FIG. 3 are depicted as being connected via a single bus 390, they may be connected through one or more internal data transport means. For example, processor 310 and main memory 320 may be connected via a local microprocessor bus while mass storage device 330, peripheral device port(s) 380, portable storage device 340, and display system 370 may be connected via one or more input/output (I/O) buses.

Mass storage device 330, which could be implemented with a magnetic disk drive or an optical disk drive, is a non-volatile storage device for storing data and instructions for use by processor 310. Mass storage device 330 can store software for implementing embodiments of the present invention, including the method 200 described in the context of FIG. 2.

Portable storage medium drive(s) 340 operates in conjunction with a portable non-volatile storage medium such as a flash drive or portable hard drive to input and output data and corresponding executable code to system 300 of FIG. 3. Like mass storage device 330, software for implementing embodiments of the present invention (e.g., method 200 of FIG. 2) may be stored on a portable medium and input to the system 300 via said portable storage.

Input devices 360 provide a portion of a user interface. Input devices 360 may include an alpha-numeric keypad, such as a keyboard, for inputting alpha-numeric and other information, or a pointing device, such as a mouse. Input device 360 may likewise encompass a touchscreen display, microphone, and other input devices including virtual reality (VR) components. System 300 likewise includes output devices 350, which may include speakers or ports for displays, or other monitor devices. Input devices 360 and output devices 350 may also include network interfaces that allow for access to cellular, Wi-Fi, Bluetooth, or other hard-wired networks.

Display system 370 may include a liquid crystal display (LCD), LED display, touch screen display, or other suitable display device. Display system 370 receives textual and graphical information, and processes the information for output to the display device. In some instances, display system 370 may be integrated with or a part of input device 360 and output device 350 (e.g., a touchscreen). Peripheral ports 380 may include any type of computer support device to add additional functionality to the computer system. For example, peripheral device(s) 380 may include a modem or a router or other network communications implementation (e.g., a MiFi hotspot device).

The components illustrated in FIG. 3 are those typically found in computer systems that may be suitable for use with embodiments of the present invention. In this regard, system 300 represents a broad category of such computer components that are well known in the art. System 300 of FIG. 3 can be a personal computer, hand held computing device, smart phone, tablet computer, mobile computing device, wearable, workstation, server, minicomputer, mainframe computer, or any other computing device.

System 300 can include different bus configurations, network platforms, processor configurations, and operating systems, including but not limited to Unix, Linux, Windows, iOS, Palm OS, and Android OS. System 300 may also include components such as antennas, microphones, cameras, position and location detecting devices, and other components typically found on mobile devices. An antenna may include one or more antennas for communicating wirelessly with another device. An antenna may be used, for example, to communicate wirelessly via Wi-Fi, Bluetooth, with a cellular network, or with other wireless protocols and systems. The one or more antennas may be controlled by a processor, which may include a controller, to transmit and receive wireless signals. For example, processor execute programs stored in memory to control antenna transmit a wireless signal to a cellular network and receive a wireless signal from a cellular network. A microphone may include one or more microphone devices which transmit captured acoustic signals to processor and memory. The acoustic signals may be processed to transmit over a network via antenna.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for controlling access, comprising:
    receiving an entitlement access request from a venue device within a venue in response to the venue device retrieving ticket information from a first user device associated with a first user, the entitlement access request associated with access to audiovisual media data for the first user;
    identifying that a distance between a location of the first user device associated with the first user and a location of a second user device associated with a second user exceeds a previously specified distance;

sending an authorization request message to the second user device via a network connection in response to receipt of the entitlement access request and in response to identifying that the distance between the location of the first user device and the location of the second user device exceeds the previously specified distance;

receiving an entitlement access authorization from the second user device via the network connection following transmission of the authorization request message to the second user device; and permitting the first user to access the audiovisual media data in response to receipt of the entitlement access authorization.

2. The method of claim 1, wherein the first user is a child, and wherein the second user is at least one of a parent or a legal guardian.

3. The method of claim 1, further comprising receiving a distance configuration message from the second user device, the distance configuration message identifying the previously specified distance.

4. The method of claim 1, wherein permitting the first user to access the audiovisual media data includes permitting the first user to access the audiovisual media data via a media access device within the venue.

5. The method of claim 1, wherein permitting the first user to access the audiovisual media data includes permitting the first user to download or purchase the audiovisual media data via the first user device.

6. The method of claim 1, wherein permitting the first user to access the audiovisual media data includes permitting the first user to watch the audiovisual media data.

7. The method of claim 1, wherein permitting the first user to access the audiovisual media data includes permitting the first user to listen to the audiovisual media data.

8. The method of claim 1, wherein permitting the first user to access the audiovisual media data includes permitting the first user to play the audiovisual media data.

9. The method of claim 1, wherein the entitlement access request is also associated with access to a physical area within the venue for the first user, further comprising permitting the first user to access the physical area within the venue in response to receipt of the entitlement access authorization.

10. The method of claim 9, wherein permitting the first user to access the physical area includes transmitting an authorization indication to an entryway control system, thereby triggering an entryway to open via the entryway control system.

11. The method of claim 9, wherein permitting the first user to access the physical area includes transmitting an authorization indication to an operator device, thereby triggering a visual indicator to be displayed to an operator via the operator device, the visual indicator indicating that access is to be permitted.

12. The method of claim 9, wherein the physical area is the venue, and wherein permitting the first user to access the physical area includes permitting the first user to enter the venue.

13. The method of claim 9, wherein the physical area is a ride area, and wherein permitting the first user to access the physical area includes permitting the first user to ride the ride.

14. The method of claim 1, further comprising:
receiving an entitlement configuration message from the second user device, the entitlement configuration message identifying a second entitlement; and
rejecting the first user from accessing the second entitlement automatically upon receiving a second entitlement access request from the first user device, the second entitlement access request associated with the second entitlement.

15. The method of claim 1, further comprising:
receiving an entitlement configuration message from the second user device, the entitlement configuration message identifying a second entitlement; and
permitting the first user to access the second entitlement automatically upon receiving a second entitlement access request from the first user device, the second entitlement access request associated with the second entitlement.

16. The method of claim 1, wherein the authorization request message includes text.

17. The method of claim 1, wherein the authorization request message includes audio.

18. The method of claim 1, further comprising:
receiving the location of the first user device from the first user device; and
sending a location message to the second user device via the network connection, wherein the location message identifies the location of the first user device.

19. The method of claim 1, wherein the venue device is communicatively coupled to a ticket reader device, and wherein the venue device retrieves the ticket information from the first user device by reading the ticket information from a display screen of the first user device via the ticket reader device.

20. The method of claim 1, further comprising:
receiving the ticket information from the venue device; and
verifying authenticity of the ticket based on the ticket information.

21. A system for controlling access, the system comprising:
a communication transceiver that receives an entitlement access request from a venue device within a venue in response to the venue device retrieving ticket information from a first user device associated with a first user, the entitlement access request associated with access to audiovisual media data for the first user;
a memory that stores instructions; and
a processor coupled to the memory, wherein execution of the instructions by the processor causes the system to:
identify that a distance between a location of the first user device associated with the first user and a location of a second user device associated with a second user exceeds a previously specified distance,
transmit an authorization request message to the second user device via a network connection in response to receipt of the entitlement access request and in response to identifying that the distance between the location of the first user device and the location of the second user device exceeds the previously specified distance,
receive an entitlement access authorization from the second user device via the network connection following transmission of the authorization request message to the second user device, and
permit the first user to access the audiovisual media data in response to receipt of the entitlement access authorization.

22. The system of claim 21, wherein the communication transceiver further receives a distance configuration message from the second user device, the distance configuration message identifying the previously specified distance.

23. A non-transitory computer-readable storage medium, having embodied thereon a program executable by a processor to perform a method for controlling access, the method comprising:
- receiving an entitlement access request from a venue device within a venue in response to the venue device retrieved ticket information from a first user device associated with a first user, the entitlement access request associated with access to audiovisual media data for the first user;
- identifying that a distance between a location of the first user device associated with the first user and a location of a second user device associated with a second user exceeds a previously specified distance;
- sending an authorization request message to the second user device via a network connection in response to receipt of the entitlement access request and in response identifying that the distance between the location of the first user device and the location of the second user device exceeds the previously specified distance;
- receiving an entitlement access authorization from the second user device via the network connection following transmission of the authorization request message to the second user device; and
- permitting the first user to access audiovisual media data in response to receipt of the entitlement access authorization.

* * * * *